(12) United States Patent
Schlater et al.

(10) Patent No.: US 8,562,057 B1
(45) Date of Patent: Oct. 22, 2013

(54) MULTI-TORQUE DOUBLE PIVOT HINGE FOR A CLOSURE OF A VEHICLE

(75) Inventors: Matthew R. Schlater, Dublin, OH (US); Trenton W. Hobbs, Marysville, OH (US); Paul D. Nguyen, Hilliard, OH (US); Ryan W. Van Voorhis, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/591,694

(22) Filed: Aug. 22, 2012

(51) Int. Cl.
*B60R 7/06* (2006.01)

(52) U.S. Cl.
USPC .............................. 296/37.12; 16/335; 16/371

(58) Field of Classification Search
USPC ........ 296/146.11, 146.12, 37.12; 16/371, 335
See application file for complete search history.

(56) References Cited

U.S. PATENT DOCUMENTS

| | | | | |
|---|---|---|---|---|
| 4,719,665 A | * | 1/1988 | Bell | 16/232 |
| 5,561,887 A | * | 10/1996 | Neag et al. | 16/334 |
| 5,685,046 A | | 11/1997 | Neag et al. | |
| 6,038,738 A | * | 3/2000 | Neag et al. | 16/324 |
| 6,817,063 B1 | * | 11/2004 | Nania | 16/334 |
| 6,842,945 B2 | | 1/2005 | Hiramatsu | |
| 6,938,303 B2 | | 9/2005 | Watson et al. | |
| 7,150,492 B2 | | 12/2006 | Nania | |
| 7,249,645 B2 | | 7/2007 | Herrmann et al. | |
| RE41,143 E | * | 2/2010 | Rangnekar et al. | 296/146.11 |

FOREIGN PATENT DOCUMENTS

| | | |
|---|---|---|
| DE | 102005025359 | 1/2006 |
| EP | 1726760 | 11/2006 |

* cited by examiner

*Primary Examiner* — Lori Lyjak
(74) *Attorney, Agent, or Firm* — Rankin, Hill & Clark LLP

(57) ABSTRACT

A multi-torque double pivot hinge includes a first leaf having a first body and a second leaf having a second body. A first hinge shaft extends through the first body and defines a first pivot axis. A second hinge shaft extends through the second body and defines a second pivot axis. A connector connects the first leaf to the second leaf. The second leaf together with the connector is rotatable about the first pivot axis between a closed position and an intermediate open position. The connector engages the first leaf in the intermediate open position which prevents rotation of the connector past the intermediate open position and transfers a pivoting axis from the first pivot axis to the second pivot axis. The second leaf is then rotatable about the second pivot axis between the intermediate open position and a fully open position.

20 Claims, 12 Drawing Sheets

MULTI-TORQUE DOUBLE PIVOT HINGE FOR A CLOSURE OF A VEHICLE

BACKGROUND

Exemplary embodiments herein generally relate to a hinge for mounting a closure of a vehicle for movement towards and away from a closed position. More particularly, the present disclosure relates to a multi-torque double pivot hinge for a closure located in a cargo area of the vehicle.

It is known to provide a double pivot hinge for a closure, such as a cargo lid, located in a cargo area of a vehicle. The double pivot hinge is adapted to move the closure between a closed position and an intermediate open position about a first hinge axis and between the intermediate open position and a fully open position about a second hinge axis. The double pivot door hinge generally includes a mechanism for switching between the hinge axes at the intermediate open position both when opening and closing the closure. The known double pivot hinge can also include a stay-open feature which is configured to hold the closure in the intermediate open position.

BRIEF DESCRIPTION

In accordance with one aspect, a multi-torque double pivot hinge for an associated closure of a vehicle is provided. The hinge is adapted to allow the associated closure to move between a closed position, an intermediate open position and a fully open position. The multi-torque double pivot hinge comprises a first leaf and a second leaf. The first leaf includes a first body configured to be fixed to an associated mounting structure of the vehicle. The second leaf includes a second body configured to be mounted to the associated closure. A first hinge shaft extends through the first body and defines a first pivot axis of the hinge. A second hinge shaft extends through the second body and defines a second pivot axis of the hinge. A connector is adapted to connect the first leaf to the second leaf. The first and second hinge shafts extend through the connector. The second leaf together with the connector is rotatable about the first pivot axis between the closed position and the intermediate open position. The second leaf is fixed relative to the connector during movement between the closed position and intermediate position. The connector is configured to engage the first leaf in the intermediate open position. This engagement between the connector and first leaf defines a first stop to prevent rotation of the connector past the intermediate open position and transfers a pivoting axis of the hinge from the first pivot axis to the second pivot axis. The second leaf is then rotatable about the second pivot axis between the intermediate open position and fully open position.

In accordance with another aspect, a multi-torque double pivot hinge for an associated closure of a vehicle comprises a first leaf and a second leaf. The first leaf is configured to be fixed to an associated mounting structure of the vehicle. The first leaf including a first cutout. The second leaf is configured to be mounted to the associated closure. The second leaf includes a second cutout. A first hinge is operatively associated with the first leaf and defines a first pivot axis of the hinge. A second hinge shaft is operatively associated with the second leaf and defines a second pivot axis of the hinge. A connector has end portions mounted in the first and second cutouts for connecting the first leaf to the second leaf. The first and second hinge shafts extend through the connector. The second leaf together with the connector is rotatable about the first pivot axis between a closed position and an intermediate open position. The second leaf is fixed relative to the connector during movement between the closed position and intermediate position. The connector is configured to engage the first leaf in the intermediate open position. This engagement between the connector and first leaf defines a first stop to prevent rotation of the connector past the intermediate open position and transfers a pivoting axis of the hinge from the first pivot axis to the second pivot axis. The second leaf is then rotatable about the second pivot axis between the intermediate open position and a fully open position. The connector is configured to engage the second leaf to prevent rotation of the second leaf about the second pivot axis as the second leaf moves between the closed position and the intermediate open position. This engagement between the connector and second leaf defines a second stop which transfers the pivoting axis from the second pivot axis to the first pivot axis as the hinge moves from the intermediate open position to the closed position.

In accordance with yet another aspect, a vehicle comprises a load carrying floor having a cargo area provided beneath the floor, and a closure for selectively providing access to the cargo area. The closure has a first surface and a second surface. A multi-torque double pivot hinge movably connects the closure to the floor. The hinge is adapted move the closure between a closed position, an intermediate open position and a fully open position. The hinge includes a first hinge shaft defining a first pivot axis and a second hinge shaft defining a second pivot axis. The closure is moveable between the closed position and intermediate open position about the first pivot axis, and is moveable between the intermediate open position and the fully open position about the second pivot axis. An anti-rotation device and a high torque creator are operatively associated with the first shaft. The high torque creator is configured to create a high resistive torque which provides a hold-open feature for the closure allowing the closure to be held open at any position between the closed position and the intermediate open position. A low torque creator is operatively associated with the second shaft. The low torque creator is configured to create a low resistive torque which provides another hold-open feature for the closure allowing the closure to be held open at any position between the intermediate open position and a predetermined position located between the intermediate open position and the fully open position. In the closed position, the first and second shafts of the hinge are located beneath the floor allowing the first surface of the closure to be substantially coplanar with the floor. In the intermediate position, the second shaft of the hinge is located above the floor. The location of the second hinge shaft in the intermediate open position allows the second surface of the closure to be substantially coplanar with the floor in the fully open position.

DETAILED DESCRIPTION

It should, of course, be understood that the description and drawings herein are merely illustrative and that various modifications and changes can be made in the structures disclosed without departing from the present disclosure. In general, the figures of the exemplary multi-torque double pivot hinge are not to scale. It should be appreciated that the term "plurality" means "two or more", unless expressly specified otherwise. It will also be appreciated that the various identified components of the exemplary multi-torque double pivot hinge disclosed herein are merely terms of art that may vary from one manufacturer to another and should not be deemed to limit the present disclosure.

Figure 8:
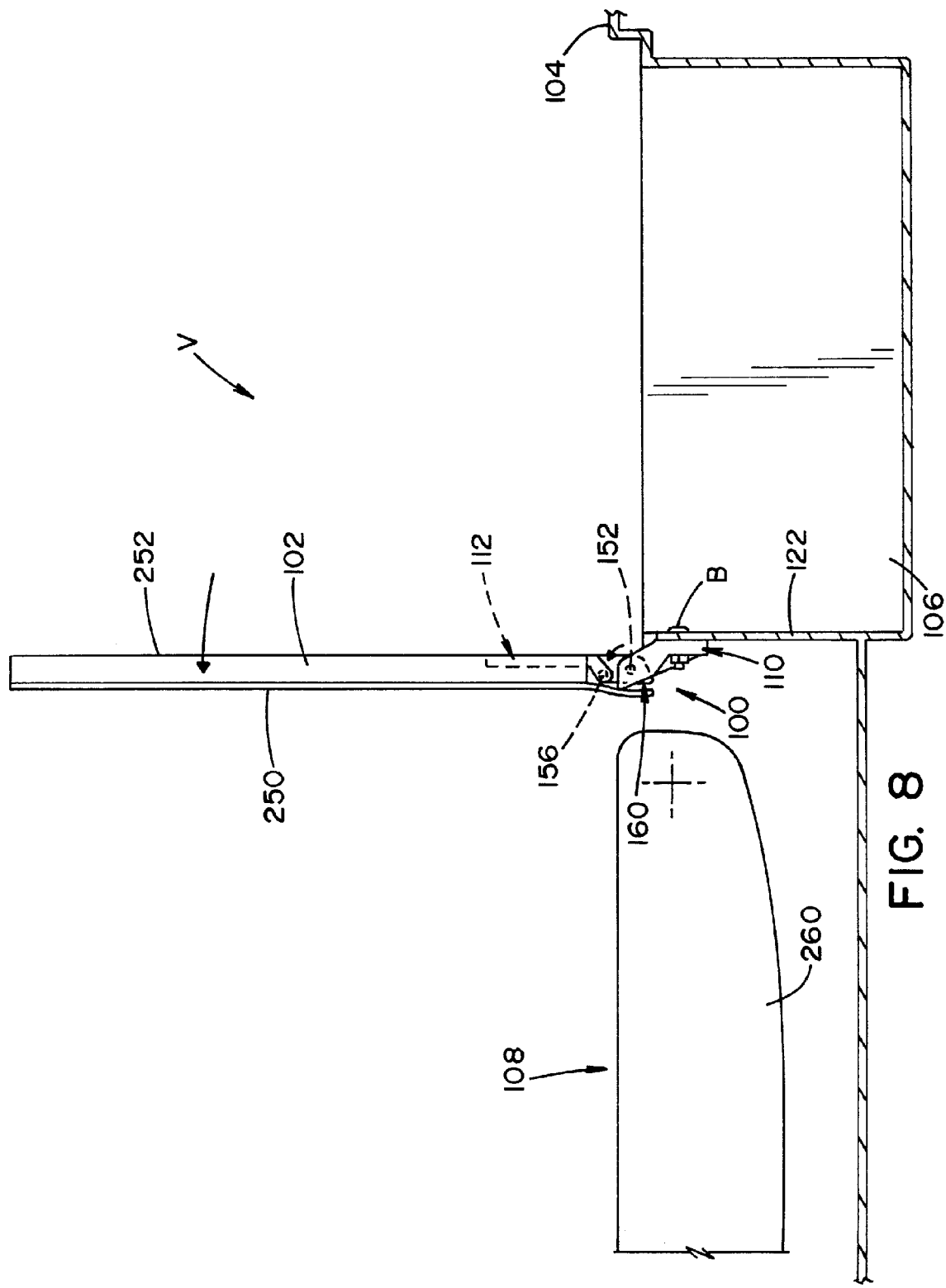
FIG. 8 is a partial cross-sectional view of the vehicle of FIG. 1 showing the closure in the intermediate open position.
Figure 9:
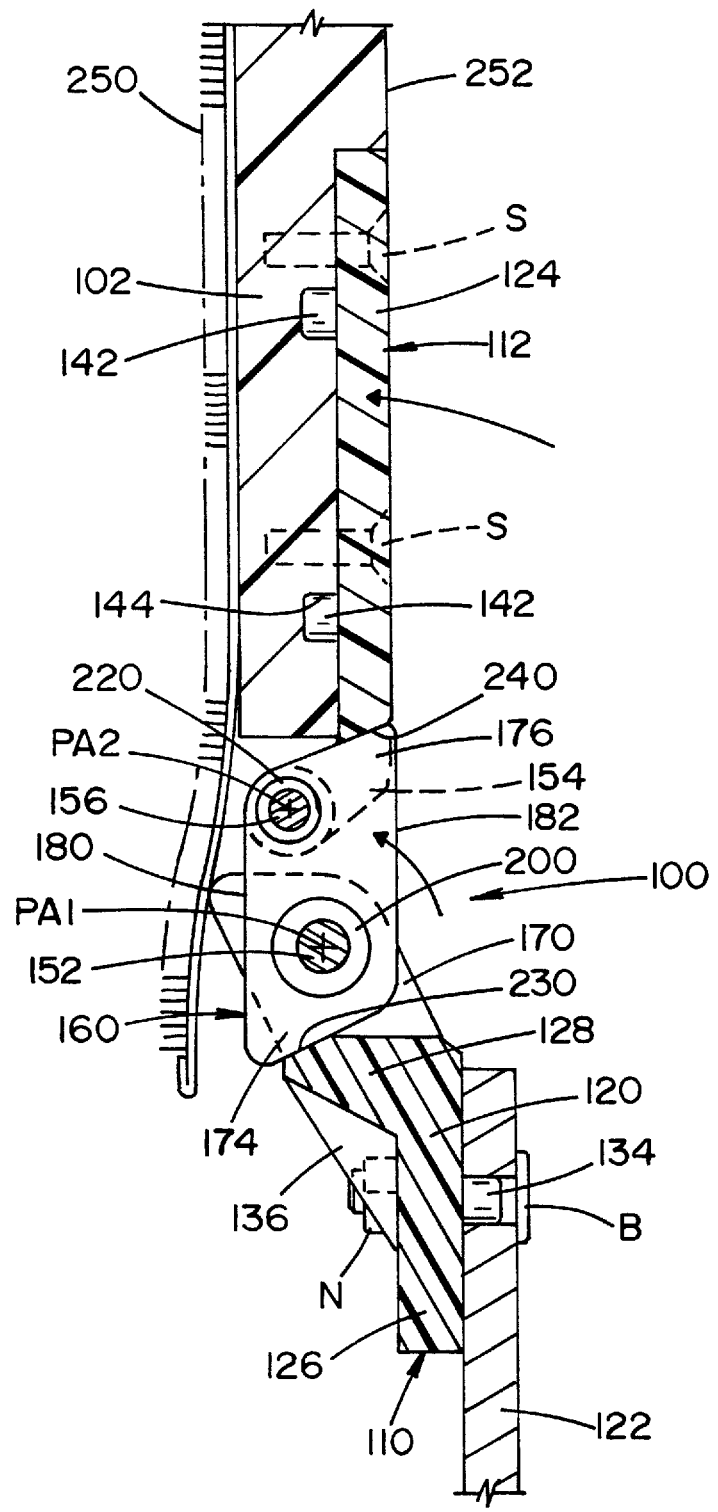
FIG. 9 is a cross-sectional view of the hinge of FIG. 8.
Figure 10:
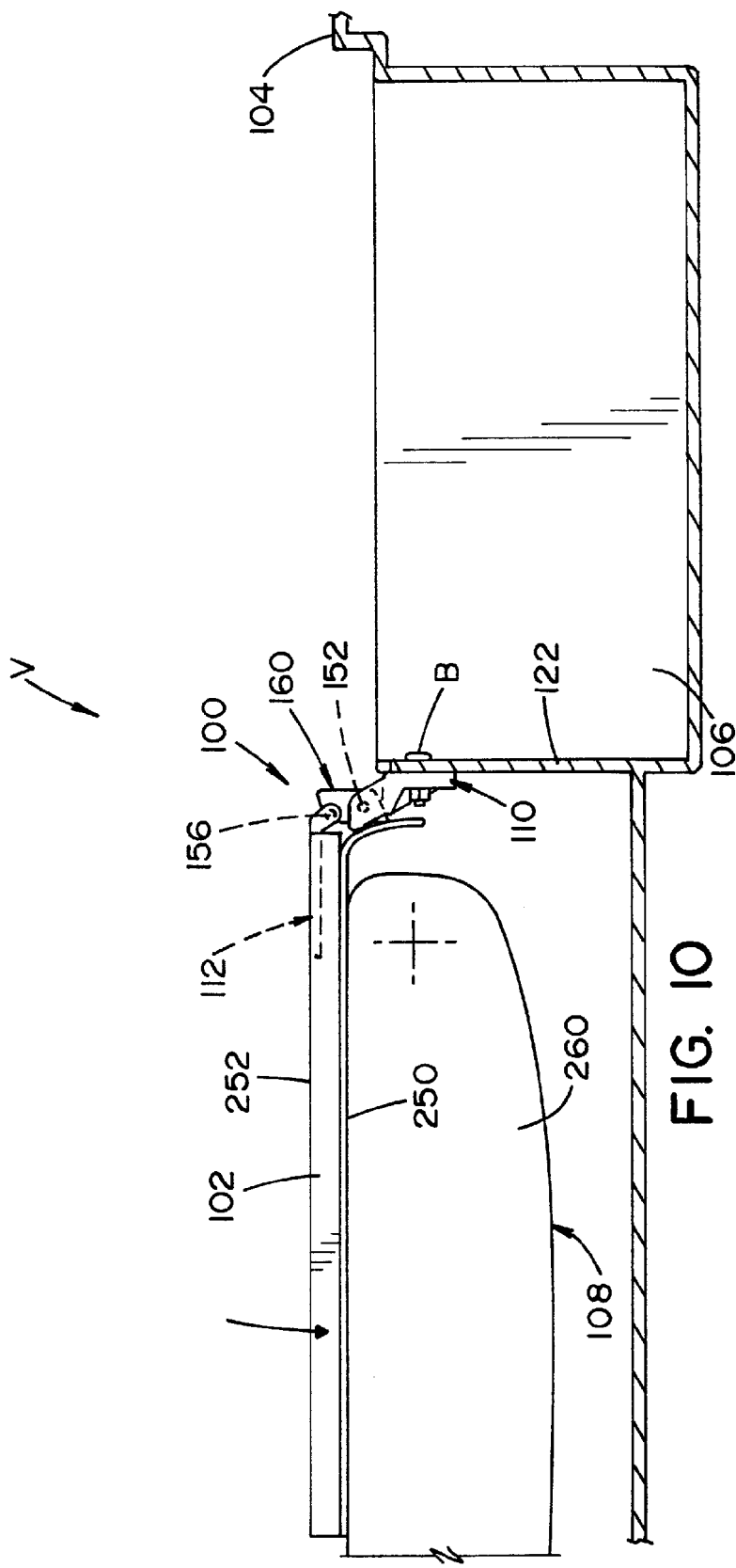
FIG. 10 is a partial cross-sectional view of the vehicle of FIG. 1 showing the seat in a cargo mode and the closure in the fully open position.

Referring now to the drawings, wherein like numerals refer to like parts throughout the several views, FIGS. 1-11 illustrate an exemplary multi-torque double pivot hinge 100 for a closure 102 of a vehicle V according to one aspect of the present disclosure. As depicted, the vehicle comprises a load carrying floor 104 having a cargo area 106 provided beneath the floor. A vehicle seat 108 is located forward of the closure 102. The closure 102 selectively provides access to the cargo area 106. The multi-torque double pivot hinge 100 movably connects the closure 102 to the floor 104. The hinge 100 is adapted to allow the closure 102 to move between a closed position (FIG. 1), an intermediate open position (FIG. 8) and a fully open position (FIG. 10). It should be appreciated that a pair of spaced apart hinges 100 is typically used to mount the closure 102 to the floor 104.

The multi-torque double pivot hinge 100 generally comprises a first leaf 110 and a second leaf 112. The first leaf 110 includes a first body 120 configured to be fixed to a mounting structure 122 of the vehicle. The mounting structure 122 can at least partially define the cargo area 106; although, this is not required. The second leaf 112 includes a second body 124 configured to be mounted to the closure 102. Particularly, and as shown in FIGS. 2-5, the first body 120 includes a first portion 126 and a second portion 128, extending from the first portion 128 away from the second leaf 112. The first portion 126 of the first body 120 includes mounting apertures 130 sized to receive conventional fasteners, such as the illustrated bolts B. The bolts B extend through the apertures 130 and corresponding openings 132 located on the mounting structure 122 and have nuts N secured thereto. The first body 120 can further include a positioning pin 134 which is received in a corresponding recess (not shown) provided on the mounting structure 122 for properly positioning the first leaf 110 on the mounting structure 122. Strengthening members or gussets 136 can be provided between the first and second portions 126,128 of the first body 120 to provide rigidity to the first leaf 110. Similarly, the second body 124 includes mounting apertures 140 sized to receive conventional fasteners, such as the illustrated screws S which threadingly engage the closure, and can further include positioning pins 142 which are received in a corresponding recesses 144 provided on the closure 102 for properly positioning the second leaf 112 on the closure 102.

The first leaf 110 further includes a first sleeve 150 which extends outwardly from the first body 120. A first hinge shaft 152 extends through the first body 120, specifically the first sleeve 150, and defines a first pivot axis PA1 of the hinge 100. The first shaft 152 has a smooth outer surface which allows rotation of the second leaf about the first shaft. The second leaf 112 also includes a second sleeve 154 which extends outwardly from the second body 124. A second hinge shaft 156 extends through the second body 124, specifically the second sleeve 154, and defines a second pivot axis PA2 of the hinge 100. The second shaft 156 has a roughened outer surface for gripping the second leaf 112 as the second shaft rotates. The first and second shafts extend parallel to each other. A connector 160 is adapted to connect the first leaf 110 to the second leaf 112. More particularly, the first sleeve 150 of the first leaf 110 includes a first cutout 170 and the second sleeve 154 of the second leaf 112 includes a second cutout 172. A first end portion 174 of the connector 160 is positioned in the first cutout 170 and a second end portion 176 of the connector is positioned in the second cutout 172. The first and second end portions 174,176 of the connector have a shape similar to the respective shapes of the first and second sleeves 150,154. The connector 160 also includes an upper planar surface 180 and a lower planar surface 182 which extends substantially parallel to the upper surface. The shapes of the end portions 174,176 together with the planar surfaces 180, 182 of the connector 160 provide a low profile for the hinge 100 when the closure 102 is in the closed position. The first and second hinge shafts 152,156 extend through the connector 160.

It should be appreciated that the first and second sleeves 150 and 154 of the respective first and second leafs 110 and 112 can each include a bore extending at least partially therethrough for receipt of at least the respective first and second hinge shafts 152 and 156; although, this is not required. For example, and as depicted in the figures, the first and second sleeves 150 and 154 can be respective portions of the first and second bodies 120 and 124 of the respective first and second leafs 110 and 112 that are each overmolded onto the respective first and second shafts 152 and 156.

With continued reference to FIGS. 2-5, the hinge 100 further includes an anti-rotation device 200 configured to allow rotation of the second leaf 112 together with the connector 160 in a single direction from the closed position to the intermediate open position. The anti-rotation device 200 can be provided in one of the first sleeve 150 and the connector 160, and the first shaft 152 extends through the anti-rotation device. In the depicted embodiment, the anti-rotation device is housed in the connector. For example, the connector 160 can be overmolded onto the anti-rotation device 200. The anti-rotation device 200 can be a one-way bearing, a one-way clutch or a similar device which allows rotation in a single direction. The hinge 100 is also adapted to prevent rotation of the first shaft 152 as the second leaf 112 together with the connector 160 rotate from the closed position to the intermediate open position via the anti-rotation device 200. To this end, the hinge 100 includes a high torque creator 210 operatively associated with the first shaft 152. The high torque creator 210 can be provided in the other of the first sleeve 150 and the connector 160. In the depicted embodiment, with the anti-rotation device 200 being housed in the connector 160, the high torque creator is enclosed in the first sleeve 150, for example, by overmolding the first sleeve 150 onto the high torque creator 210. As shown, the high torque creator 210 is housed in that portion 212 of the first sleeve 150 located on one side of the connector 160. It should also be appreciated that the hinge 100 can include a pair of high torque creators operatively associated with the first shaft 152, each high torque creator being housed in the first sleeve 150 with the pair of high torque creators configured to create the same high resistive torques or differing high resistive torques. For example, according to this aspect, the pair of high torque creators can be separated by the connector 160, one high torque creator being housed in portion 212 and the other being housed in that portion 214 of the first sleeve 150 located on the other side of the connector 160. The high torque creator 210 is configured to create a high resistive torque which is opposite the direction of rotation as the hinge 100 moves from the closed position toward the intermediate open position. This high resistive torque provides a hold-open feature for the closure 102 and supports the closure at selected angular positions relative to the floor 104. According to the present disclosure, the hold-open feature provided by the high torque creator 210 allows the closure 102 to be held open at any position between the closed position and the intermediate open position.

According to one aspect, the high torque creator 210 can utilize a helical spring wrapped around the first shaft 152. In a relaxed state, the spring has an inner diameter less than the outer diameter of the first shaft 150 to frictionally engage the first shaft so that the spring and first shaft will tend to rotate together. In use, rotation of the closure from the intermediate position toward the closed causes the spring to slip relative to the first shaft 152, which is also rotating together with the second leaf 112 and connector 160. This slipping, in turn, generates a fairly constant torque or resistance to movement of the closure 102 toward the closed position. According to another aspect, the high torque creator 210 can utilize a plurality of clips housed in a restraint. The clips are frictionally engaged to the first shaft 152. When the clips are in a relaxed state (i.e., when the closure 102 is in the intermediate open position), the clips have a diameter smaller than the outer diameter of first shaft 156. In operation, as the closure 102 moves from the intermediate open position toward the closed position via rotation of the first shaft 152, friction caused by the interference fit between first shaft 152 and the clips causes the clips to rotate with the first shaft 152. However, the restraint engages the clips such that the clips are not able to rotate as the first shaft 152 is rotated. This, in turn, causes the high resistive torque as the closure 102 is moved toward the closed position. Again, the high resistive torque provides the hold-open feature which supports the closure 102 at various angular locations between the intermediate open position and the closed position relative to the floor 104. It should be appreciated that the amount of torque created is dependent on the number of clips. By adding additional clips to the first shaft 152, torque will be increased.

Figure 1:
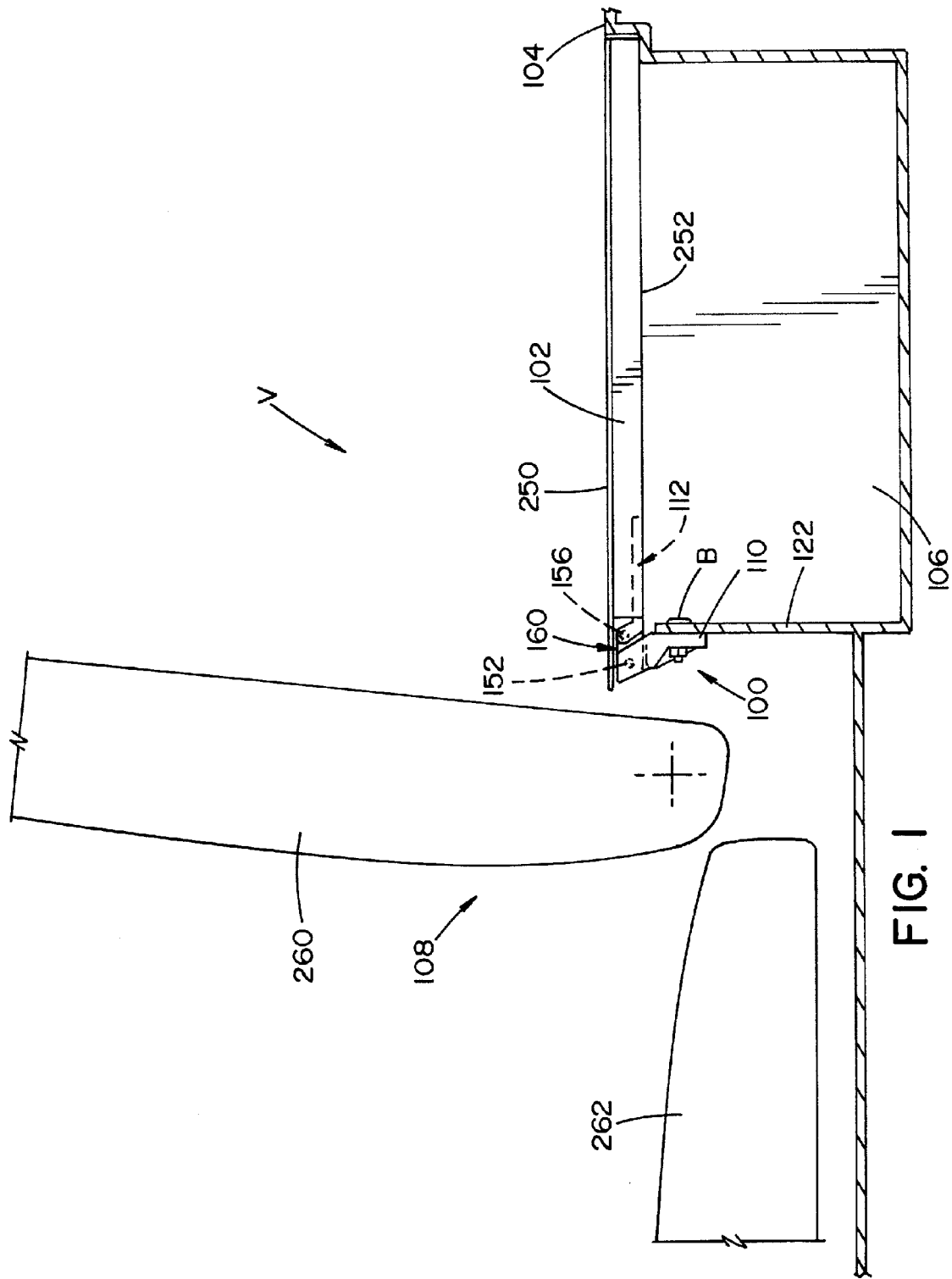
FIG. 1 is a partial cross-sectional view of a vehicle including a load carrying floor having a cargo area provided beneath the floor, a closure for selectively providing access to the cargo area, and a seat provided forwardly of the closure. An exemplary multi-torque double pivot hinge according to one aspect of the present disclosure connects the closure to the floor, and moves the closure between a closed position, an intermediate open position and a fully open position.
Figure 2:
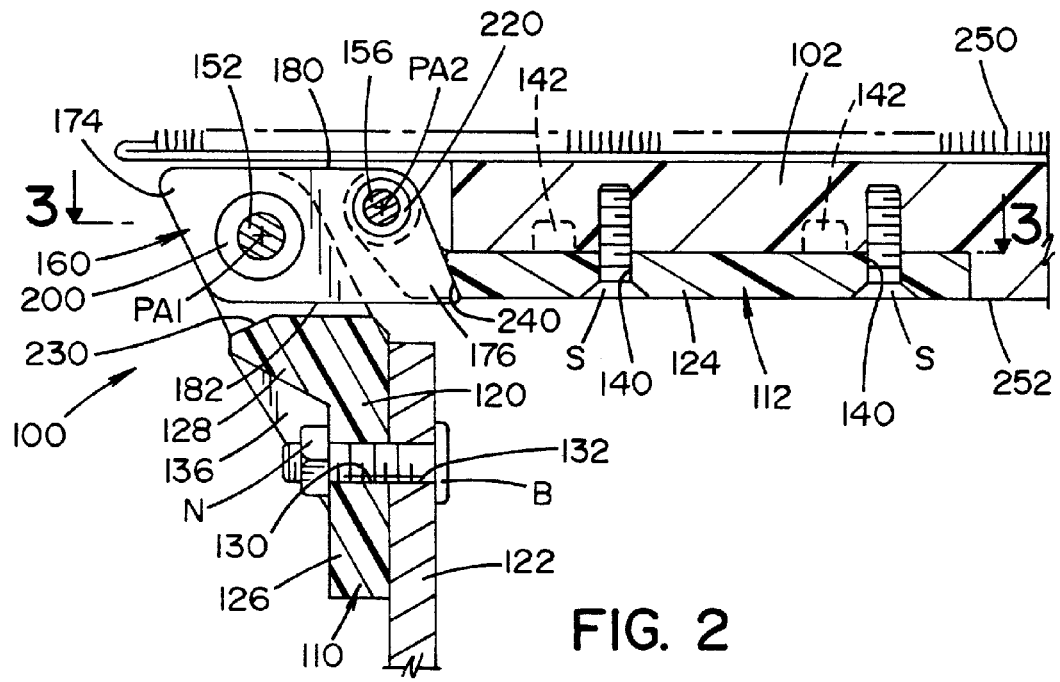
FIG. 2 is a cross-sectional view of the hinge of FIG. 1.
Figure 3:
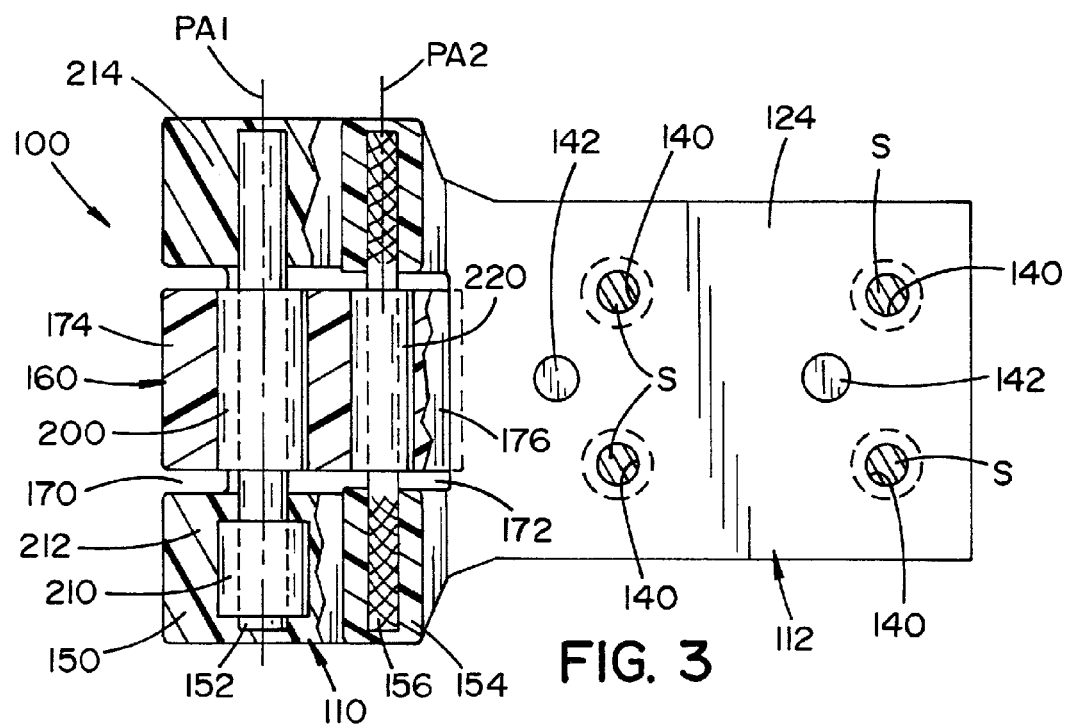
FIG. 3 is a cross-sectional view of the hinge of FIG. 2 taken along line 3-3 of FIG. 2.
Figure 4:
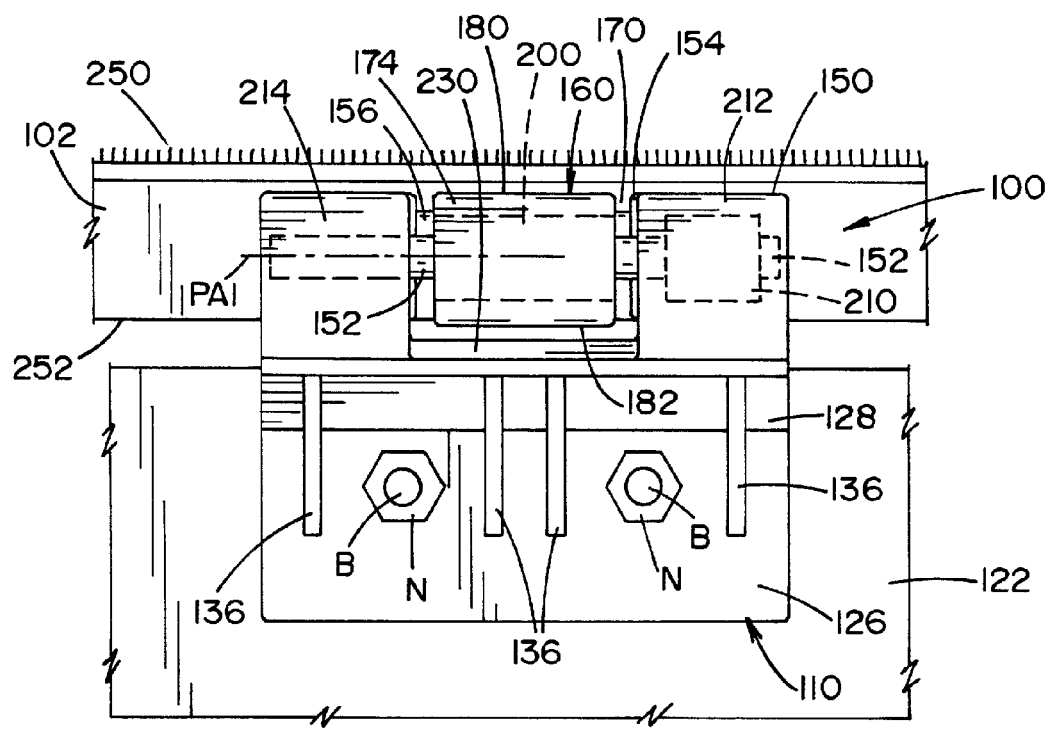
FIG. 4 is a partial front view of the hinge of FIG. 1.
Figure 5:
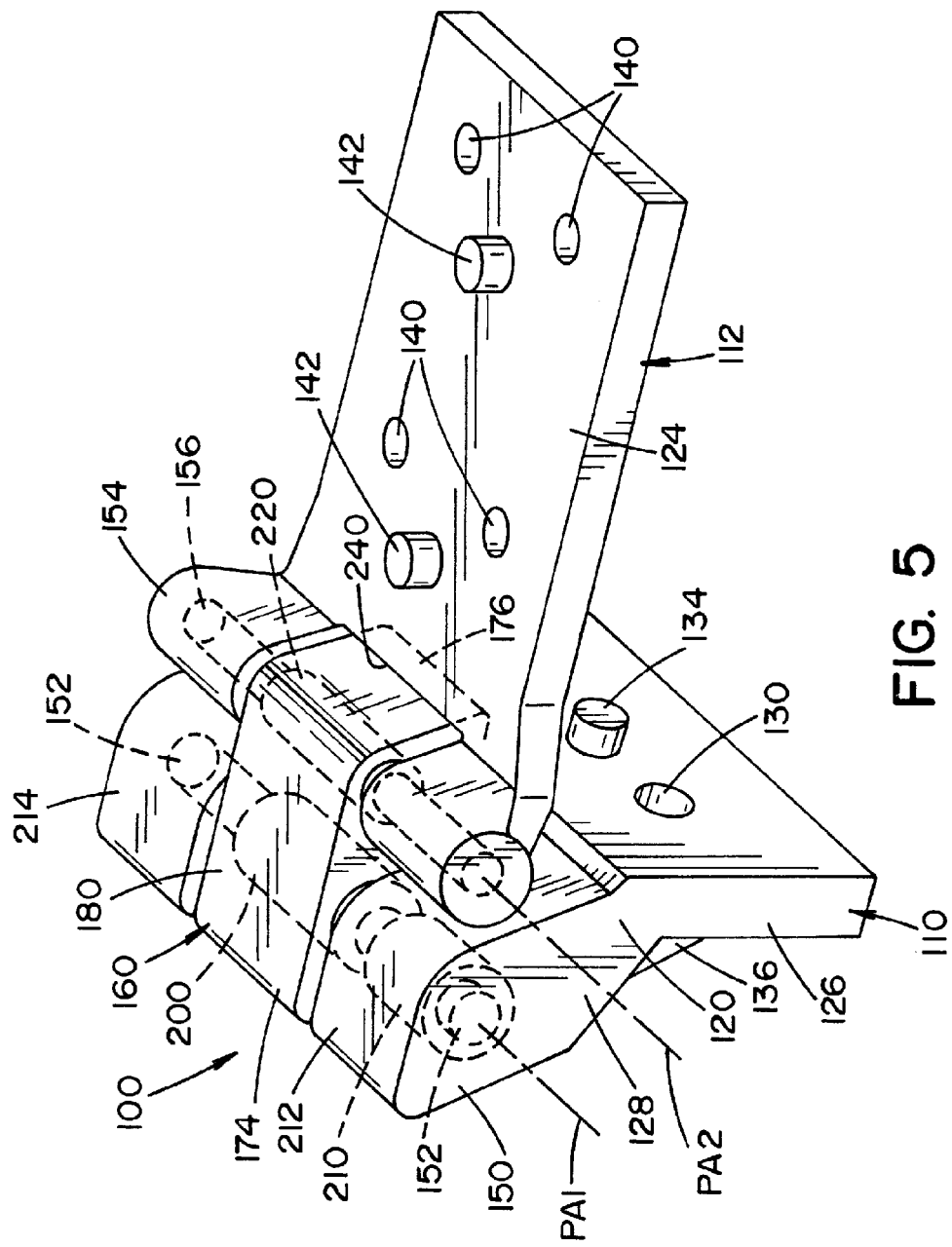
FIG. 5 is a perspective view of the hinge of FIG. 1.

As shown in FIGS. 2, 3 and 5, a low torque creator 220 is operatively associated with the second shaft 156. The low torque creator 220 can be provided in one of the second sleeve 154 and the connector 160, and the second shaft 156 extends through the low torque creator. In the depicted embodiment, the low torque creator 220 is enclosed in the connector 160, for example, by overmolding the connector 160 onto the low torque creator 220. The low torque creator 220 is configured to create a low resistive torque which is opposite the direction of rotation as the closure 100 (i.e., hinge 100) moves between the intermediate open position and the fully open position. The second leaf 112 rotates together with rotation of the second shaft 156 between the intermediate open position and the fully open position. Rotation of the second shaft causes the low torque creator to create the low resistive torque. Similar to the high resistive torque created by the high torque creator 210, the low resistive torque provides another hold-open feature for the closure 102. However, the hold-open feature provided by the low torque creator only allows the closure 102 to be held open at any position between the intermediate open position and a predetermined position located between the intermediate open position and the fully open position. For example, the predetermined position can be between 110 degrees and 130 degrees relative to the vehicle floor 104. The low torque creator 220 can have a structure similar to the structure of the high torque creator 210 described above. If the low torque creator 220 includes the clips and restraint, it should be appreciated that the low torque creator 220 will include fewer clips than the high torque creator 210.

Figure 6:
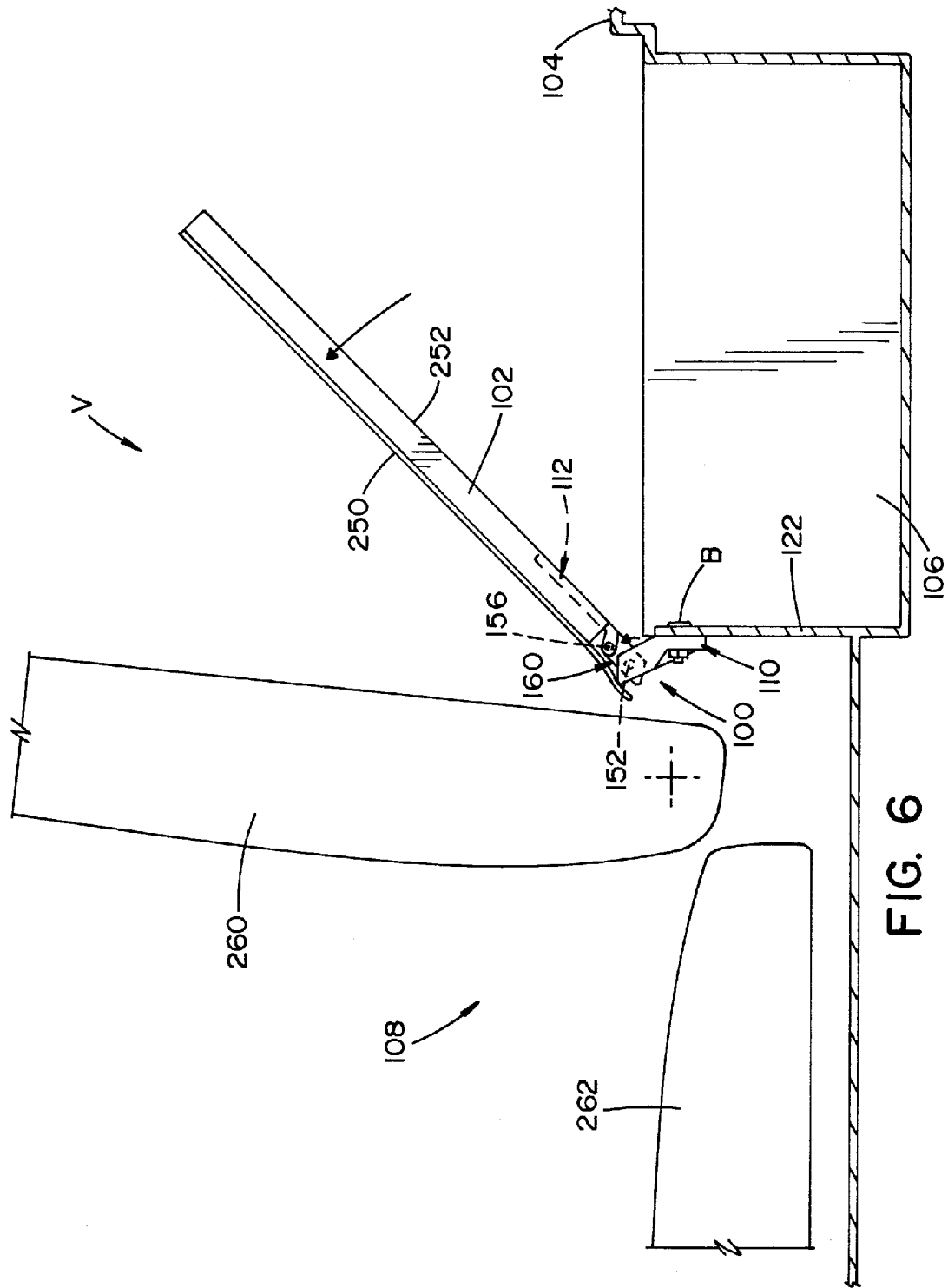
FIG. 6 is a partial cross-sectional view of the vehicle of FIG. 1 showing the closure moving from the closed position toward the intermediate open position via the exemplary hinge.
Figure 7:
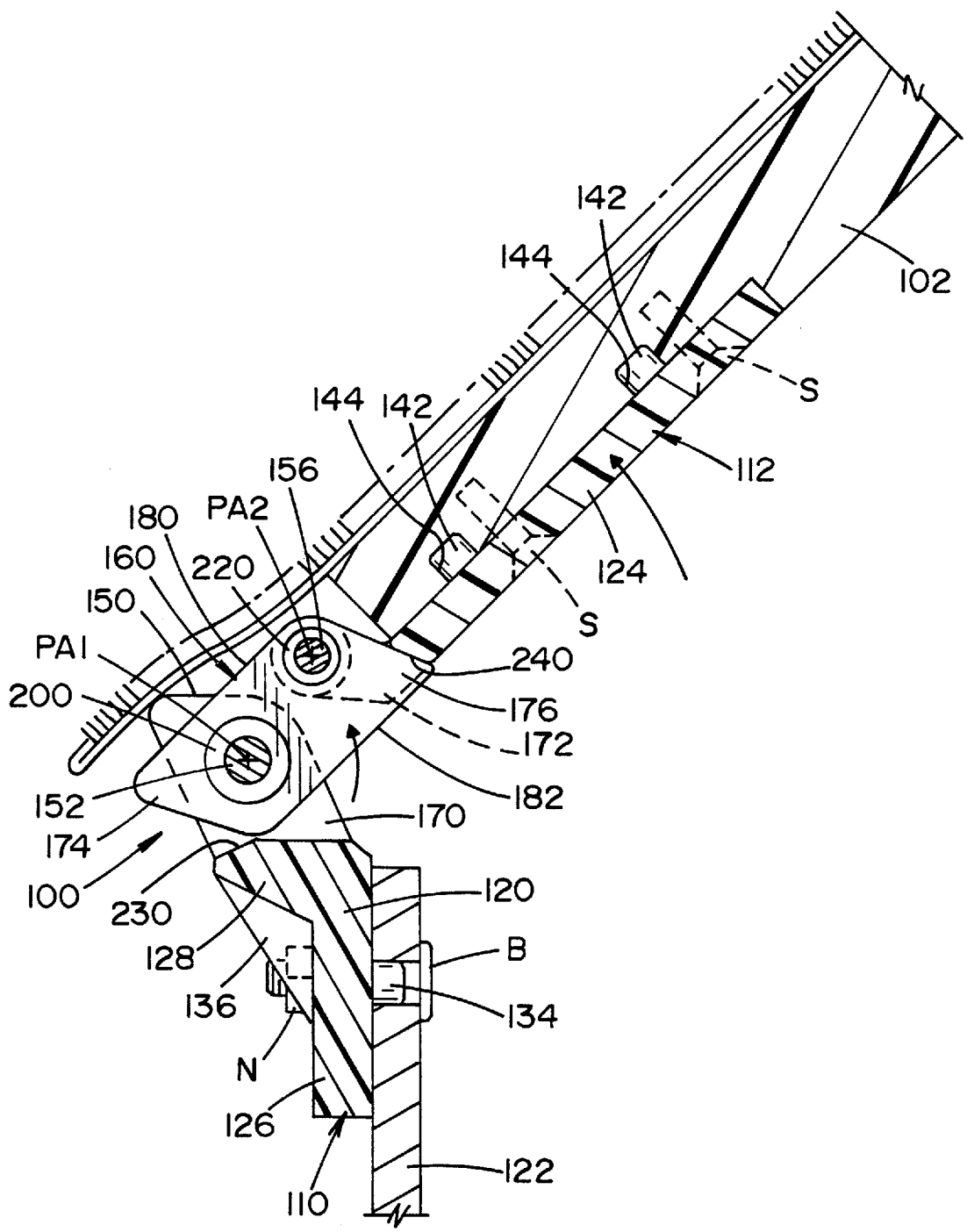
FIG. 7 is a cross-sectional view of the hinge of FIG. 6.

As indicated above, the second leaf 112 together with the connector 160 are rotatable about the first pivot axis PA1 between the closed position and the intermediate open position of the closure 102. The second leaf 112 is fixed relative to the connector 160 during movement between the closed position and intermediate position. The connector 160 is configured to engage the first leaf 110 in the intermediate open position. Specifically, as shown in FIGS. 8 and 9, in the intermediate open position of the closure 102, the first end portion 174 of the connector contacts a section 230 provided on the second portion 128 of the first body 120 of the first leaf 110. The section 230 is located in the cutout 170 which allows for easy engagement of the connector 160. This engagement between the connector 160 and the section 230 defines a first stop to prevent rotation of the connector past the intermediate open position of the closure 102 and transfers a pivoting axis of the hinge 100 from the first pivot axis PA1 to the second pivot axis PA2. The second leaf 112 is then rotatable about the second pivot axis PA2 between the intermediate open position and a fully open position of the closure 102. The connector 160 is also configured to engage the second leaf 112 to prevent rotation of the second leaf 112 about the second pivot axis PA2 as the second leaf (i.e., closure 102) moves between the closed position and the intermediate open position. Specifically, as shown in FIGS. 6 and 7, in the intermediate open position of the closure 102, the second end portion 176 of the connector 160 contacts a section 240 provided on the second body 124 of the second leaf 112. Similar to section 230, the section 240 is located in the cutout 172 which allows for easy engagement of the connector 160. This engagement between the connector 160 and section 240 defines a second stop which transfers the pivoting axis from the second pivot axis PA2 to the first pivot axis PA1 as the closure 102 moves from the intermediate open position to the closed position.

With reference back to FIG. 1, in the closed position of the closure 102, the hinge 100 is located beneath the floor 102 allowing a first surface 250 of the closure 102 to be substantially coplanar with the load carrying floor 104. This provides a clean look and appearance to the floor. As the closure 102 is moved from the closed position toward the intermediate open position (FIGS. 6 and 7), the connector 160 engages the section 240 of the second leaf 112. As indicated above, this prevents the rotation of the connector and second leaf about the second pivot axis PA2 (which is defined by the second shaft 156). The hinge 100 rotates about the first pivot axis PA1 (which is defined by the first shaft 152) via the anti-rotation device 200, and no resistive force is created by the high torque creator 210. The first shaft 152 is fixed as the closure 102 moves from the closed portion toward the intermediate open position. Again, the high resistive torque created by the high torque creator 210 provides the hold-open feature which supports the closure 102 at various angular locations between the intermediate open position and the closed position relative to the floor 104. In other words, the weight of the closure 102 provides a force toward the closed position. This force causes rotation of the closure 102 (via rotation of the first shaft 152) back toward the closed position. However, rotation of the first shaft 152 generates the high resistive force via the high torque creator 210. This high resistive force is greater than the force associated with the weight of the closure 102 thereby allowing the closure 102 to maintain its position. To move the closure 102 back toward the closed position, a user applies a downward force to the closure; this downward force overcomes the high resistive force allowing the closure to move to the closed position.

With reference to FIGS. 8 and 9, in the intermediate open position of the closure 102, the closure is oriented substantially perpendicular to the floor 104. Thus, the force associated with the weight of the closure 102 is directed downwardly. In the intermediate open position, the first shaft is located at least partially below the floor 104 and the second shaft is located above the floor. As stated above, the connector 160 engages the section 230 of the first leaf 110. This engagement transfers the pivoting axis of the hinge from the first pivot axis PA1 of the second pivot axis PA2. The second leaf 112 of the hinge 100 is then rotatable with the second shaft 156 about the second pivot axis between the intermediate open position and fully open position. Particularly, the second shaft 156 has a roughened outer surface for gripping the second leaf 112 as the second shaft rotates. Rotation of the second shaft 156 generates the low resistive force via the low torque creator 220. This low resistive force is greater than the force associated with the weight of the closure 102 up to the predetermined position between the intermediate open position and the fully open position. As the closure 102 moves past the predetermined position, the force associated with the weight of the closure 102 exceeds the low resistive force allowing the closure 102 to move toward the fully open position.

Figure 11:
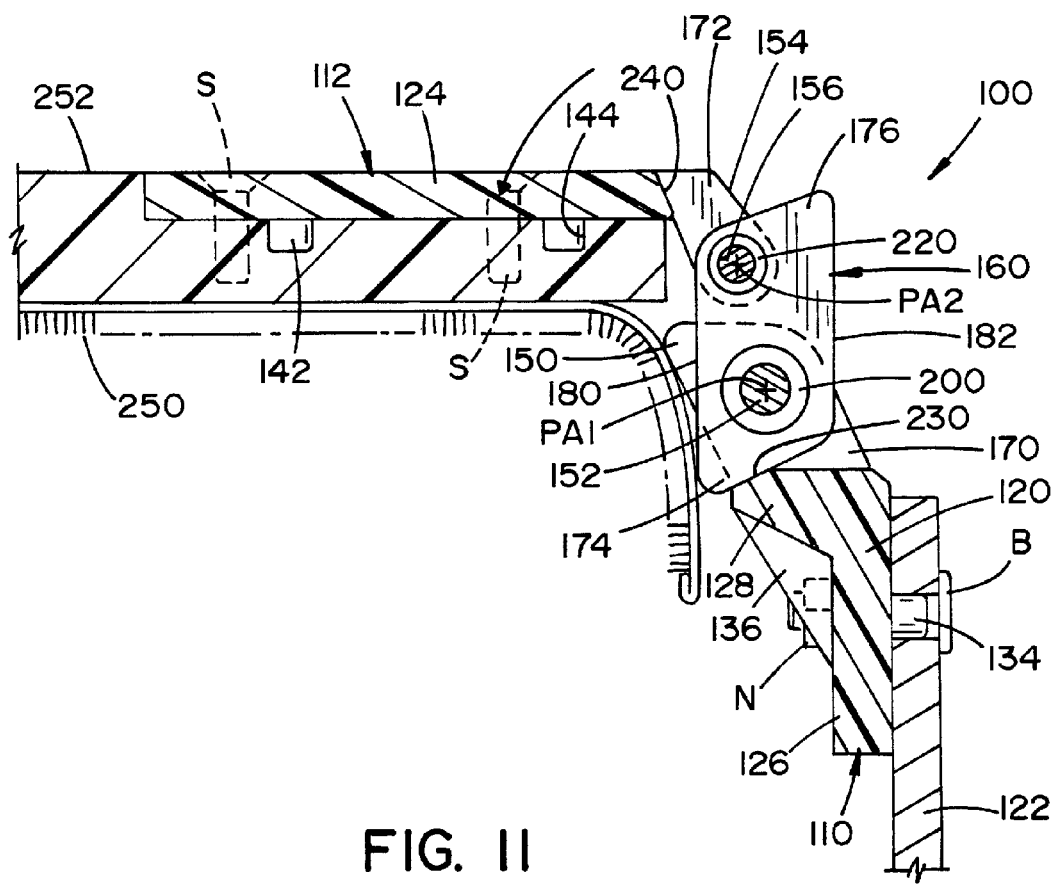
FIG. 11 is a cross-sectional view of the hinge of FIG. 10.

With reference to FIGS. 10 and 11, the closure 102 is in the fully open position. It should be appreciated that prior to moving to the fully open position, the seat 108 must be moved into its cargo mode wherein a seat back 260 is folded onto a seat base 262. In this position, the closure 102 lays substantially flat on the seat back 260 (i.e., when the seat 108 is in the cargo mode). The location of the second hinge shaft 156 in the intermediate open position allows a second surface 252 of the closure 102 to be substantially coplanar with the floor 104 in the fully open position. The operation of the hinge 100 as the closure 102 moves from the fully open position toward the closed position should be evident to one skilled in the art based on the above disclosure and is omitted for conciseness.

Figure 12:
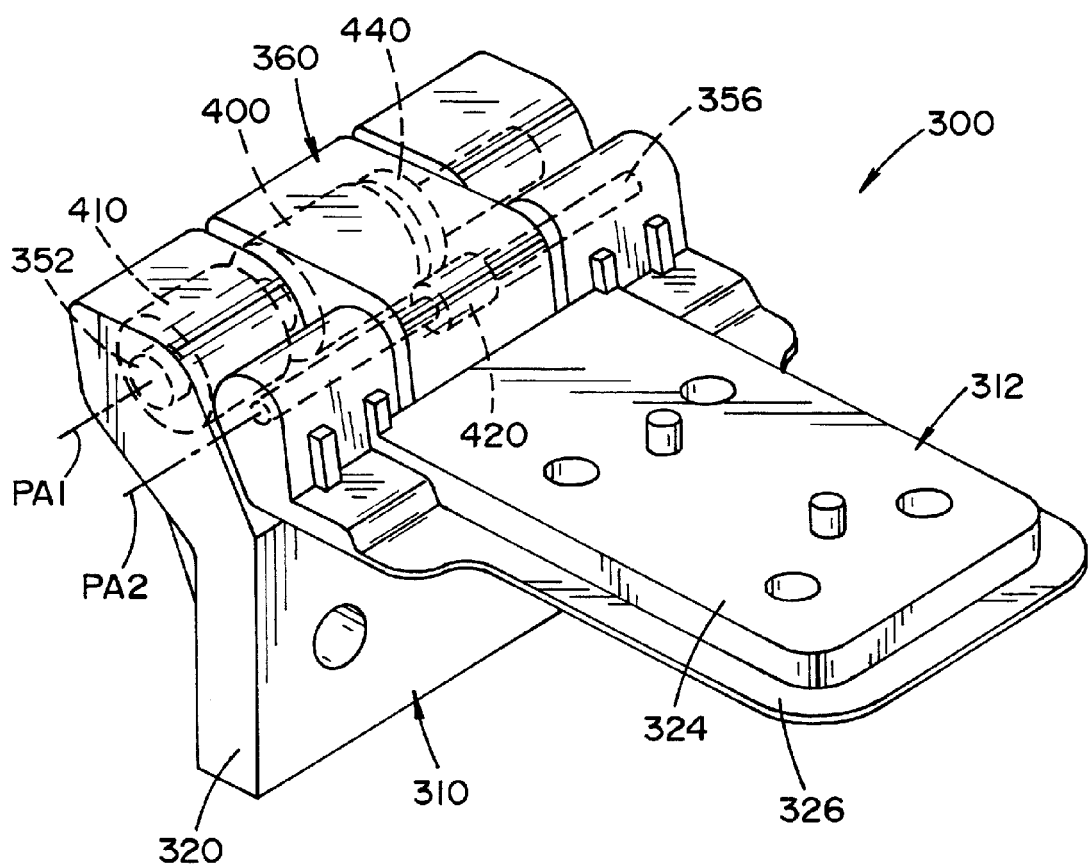
FIG. 12 is a perspective view of an exemplary multi-torque double pivot hinge according to another aspect of the present disclosure, the hinge connecting the closure of FIG. 1 to the vehicle load carrying floor, and moving the closure between a closed position, an intermediate open position and a fully open position.
Figure 13:
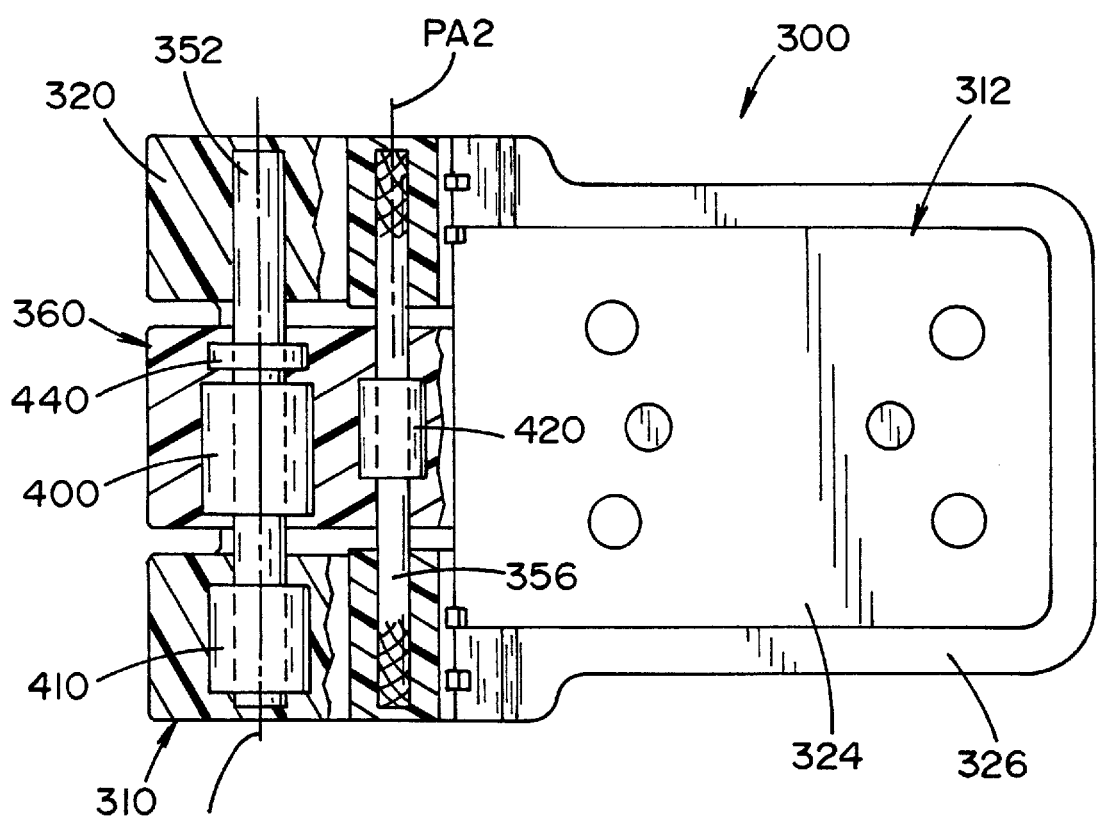
FIG. 13 is a cross-sectional view of the hinge of FIG. 12.

FIGS. 12 and 13 depict an exemplary multi-torque double pivot hinge 300 for the closure 102 of the vehicle V according to another aspect of the present disclosure. Similar to hinge 100, the hinge 300 is adapted to allow the closure 102 to move between a closed position, an intermediate open position and a fully open position. The multi-torque double pivot hinge 300 generally comprises a first leaf 310 and a second leaf 312. The first leaf 310 includes a first body 320 configured to be fixed to the mounting structure 122 of the vehicle. The second leaf 312 includes a second body 324 configured to be mounted to the closure 102. A flange 326 can be provided about a peripheral edge of the second body 324. A first hinge shaft 352 extends through the first body 320 and has a smooth outer surface which allows rotation of the second leaf about the first shaft. A second hinge shaft 356 extends through the second body 324 and has a roughened outer surface for gripping the second leaf 312 as the second shaft rotates. The first and second hinge shafts 352, 356 extend through a connector 360 which is adapted to connect the first leaf 310 to the second leaf 312.

In a manner similar to hinge 100, the connector 360 is configured to engage the first leaf 310 in the intermediate open position of the closure 102. This engagement defines a first stop to prevent rotation of the connector 360 past the intermediate open position of the closure 102 and transfers a pivoting axis of the hinge 300 from a first pivot axis PA1 to a second pivot axis PA2. The second leaf 312 is then rotatable about the second pivot axis PA2 between the intermediate open position and a fully open position of the closure 102. The connector 360 is also configured to engage the second leaf 312 to prevent rotation of the second leaf 312 about the second pivot axis PA2 as the closure 102 moves between the closed position and the intermediate open position. This engagement defines a second stop which transfers the pivoting axis from the second pivot axis PA2 to the first pivot axis PA1 as the closure 102 moves from the intermediate open position to the closed position.

Similar to hinge 100, hinge 300 further includes an anti-rotation device 400 configured allow rotation of the second leaf 312 together with the connector 360 in a single direction from the closed position to the intermediate open position. As shown, the anti-rotation device 400 can be housed in the connector 360 (e.g., by overmolding the connector 360 onto the anti-rotation device 400), and the first shaft 352 extends through the anti-rotation device. As indicated above, the anti-rotation device 400 can be a one-way bearing, a one-way clutch or a similar device which allows rotation in a single direction.

At least one high torque creator 410 (which can have a structure similar to high torque creator 210) can be provided in the first body 320 (e.g., by overmolding the first body onto the high torque creator 410) and is operatively associated with the first shaft 352. The high torque creator 410 is configured to create a high resistive torque which is opposite the direction of rotation as the hinge 300 moves from the closed position toward the intermediate open position. This high resistive torque provides a hold-open feature for the closure 102 and supports the closure at selected angular positions that are between the closed position and the intermediate open position relative to the floor 104. For example, the hold-open feature provided by the high torque creator 410 allows the closure 102 to be held open at any angular position between 10 degrees and 90 degrees relative to the vehicle floor 104.

A low torque creator 420 (which can have a structure similar to low torque creator 220) is operatively associated with the second shaft 356 and can be provided in the connector 360 (e.g., by overmolding the connector 360 onto the low torque creator 420). The low torque creator 420 is configured to create a low resistive torque which is opposite the direction of rotation as the closure 102 (i.e., hinge 300) moves between the intermediate open position and the fully open position. The second leaf 312 rotates together with rotation of the second shaft 356 between the intermediate open position and the fully open position. Rotation of the second shaft causes the low torque creator to create the low resistive torque. Similar to the low torque creator 220 of the hinge 100, the low resistive torque created by the low torque creator 420 can provide another hold-open feature for the closure 102 which allows the closure 102 to be held open at selected positions between the intermediate open position and a predetermined position (e.g., between 110 degrees and 130 degrees relative to the vehicle floor 104) located between the intermediate open position and the fully open position.

As shown in FIGS. 12 and 13, the hinge 300 further includes a supplemental torque creator 440 (which can have a structure similar to one of the high torque creator 410 and low torque creator 420) operatively associated with the first shaft 352. The supplemental torque creator 440 can be enclosed in one of the first body 320 and the connector 360. In the depicted embodiment, the supplemental torque creator 440 is positioned adjacent the anti-rotation device 400 and is housed in the connector 360 in a manner similar to the anti-rotation device 400. The supplemental torque creator 440 is configured to create a constant supplemental resistive torque via rotation of the first shaft 352. This constant supplemental resistive torque is always opposite the direction of rotation as the hinge 300 (i.e., the closure 102) moves between the closed position and the intermediate open position. The supplemental resistive torque, which is less than the low resistive torque of the low torque creator 420, is provided to dampen any vibrations of the closure 102 as the closure is moved between these positions.

As is evident from the foregoing, the proposed multi-torque double pivot hinge 100,300 allows the hinge to be hidden underneath the cargo floor 104, but when operated the second pivot 156,356 of the hinge can move from below the cargo floor 104 to above it allowing the closure 102 to fold directly onto the seat back 260 of the seat 108 (such as a third row seat). The multi-torque double pivot hinge 100,300 includes five basic components, namely, the smooth first shaft (152,352), the second shaft (156,356) having roughened end portions for engaging the second leaf (112,312), the anti-rotation device (200,400), the high torque creator (210,410), and the low torque creator (220,420). The hinge 300 further includes the supplemental torque creator 440. The connector 160,360 is configured to engage the first and second leafs. This engagement of allows for sequential movement of the closure 102 about the first and second pivot axes defined by the respective first shaft 152,352 and second shaft 156,356 between the closed position through the intermediate open position to the fully open position.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A multi-torque double pivot hinge for an associated closure of a vehicle, the hinge adapted to allow the associated closure to move between a closed position, an intermediate open position and a fully open position, the multi-torque double pivot hinge comprising:

a first leaf including a first body configured to be fixed to an associated mounting structure of the vehicle;

a second leaf including a second body configured to be mounted to the associated closure;

a first hinge shaft extending through the first body and defining a first pivot axis of the hinge and a second hinge shaft extending through the second body and defining a second pivot axis of the hinge; and a connector adapted to connect the first leaf to the second leaf, the first and second hinge shafts extending through the connector, wherein the second leaf together with the connector are rotatable about the first pivot axis between the closed position and the intermediate open position, the second leaf being fixed relative to the connector during movement between the closed position and intermediate position, the connector being configured to engage the first leaf in the intermediate open position, wherein engagement between the connector and first leaf defines a first stop to prevent rotation of the connector past the intermediate open position and transfers a pivoting axis of the hinge from the first pivot axis to the second pivot axis, wherein the second leaf is then rotatable about the second pivot axis between the intermediate open position and fully open position.

2. The hinge of claim 1, wherein the connector is configured to engage the second leaf to prevent rotation of the second leaf about the second pivot axis as the second leaf moves between the closed position and the intermediate open position, wherein engagement between the connector and second leaf defines a second stop which transfers the pivoting axis from the second pivot axis to the first pivot axis as the hinge moves from the intermediate open position to the closed position.

3. The hinge of claim 1, wherein the hinge further includes an anti-rotation device configured allow rotation of the second leaf together with the connector in a single direction from the closed position to the intermediate open position.

4. The hinge of claim 3, wherein the hinge is adapted to prevent rotation of the first shaft as the second leaf together with the connector rotate from the closed position to the intermediate open position via the anti-rotation device.

5. The hinge of claim 4, wherein the hinge further includes a high torque creator operatively associated with the first shaft, the high torque creator configured to create a high resistive torque which is opposite the direction of rotation as the hinge moves from the closed position toward the intermediate open position, the high resistive torque providing a hold-open feature for the associated closure.

6. The hinge of claim 5, wherein the hold-open feature provided by the high torque creator allows the associated closure to be held open at any position between the closed position and the intermediate open position.

7. The hinge of claim 5, wherein the first shaft has a smooth outer surface.

8. The hinge of claim 3, wherein the hinge further includes a low torque creator operatively associated with the second shaft, the low torque creator configured to create a low resistive torque which is opposite the direction of rotation as the hinge moves between the intermediate open position and the fully open position, the low resistive torque providing a hold-open feature for the associated closure.

9. The hinge of claim 8, wherein the second leaf rotates together with rotation of the second shaft between the intermediate open position and the fully open position, rotation of the second shaft causing the low torque creator to create the low resistive torque.

10. The hinge of claim 9, wherein the hold-open feature provided by the low torque creator allows the associated closure to be held open at any position between the intermediate open position and a predetermined position located between the intermediate open position and the fully open position.

11. The hinge of claim 9, wherein the second shaft has a roughened outer surface for gripping the second leaf as the second shaft rotates.

12. The hinge of claim 1, wherein the first body of the first leaf includes a first cutout and the second body of the second leaf includes a second cutout, end portions of the connector being positioned in the first and second cutouts, wherein the connector includes an upper planar surface and a lower planar surface which extends substantially parallel to the upper surface, the planar surfaces of the connector providing a low profile for the hinge.

13. The hinge of claim 1, in combination with the vehicle, the vehicle including a load carrying floor having a cargo area provided beneath the floor, the closure selectively providing access to the cargo area, wherein in the closed position, the hinge is located beneath the floor allowing a first surface of the closure to be substantially coplanar with the floor, wherein in the intermediate open position, the second shaft of the hinge is located above the floor, the location of the second hinge shaft in the intermediate open position allowing a second surface of the closure to be substantially coplanar with the floor in the fully open position of the closure,
   wherein the vehicle further include a seat positioned forward of the cargo area, the seat having a cargo mode and the hinge configured to allow the closure in the fully open position to lay substantially flat on the seat when in the cargo mode.

14. A multi-torque double pivot hinge for an associated closure of a vehicle, the hinge adapted to allow the associated closure to move between a closed position, an intermediate open position and a fully open position, the multi-torque double pivot hinge comprising:
   a first leaf configured to be fixed to an associated mounting structure of the vehicle, the first leaf including a first cutout;
   a second leaf configured to be mounted to the associated closure, the second leaf including a second cutout;
   a first hinge operatively associated with the first leaf and defining a first pivot axis of the hinge and a second hinge shaft operatively associated with the second leaf and defining a second pivot axis of the hinge; and
   a connector having end portions mounted in the first and second cutouts for connecting the first leaf to the second leaf, the first and second hinge shafts extending through the connector,
   wherein the second leaf together with the connector are rotatable about the first pivot axis between the closed position and the intermediate open position, the second leaf being fixed relative to the connector during movement between the closed position and intermediate position, the connector being configured to engage the first leaf in the intermediate open position, wherein engagement between the connector and first leaf defines a first stop to prevent rotation of the connector past the intermediate open position and transfers a pivoting axis of the hinge from the first pivot axis to the second pivot axis, wherein the second leaf is then rotatable about the second pivot axis between the intermediate open position and fully open position,
   wherein the connector is configured to engage the second leaf to prevent rotation of the second leaf about the second pivot axis as the second leaf moves between the closed position and the intermediate open position, wherein engagement between the connector and second leaf defines a second stop which transfers the pivoting axis from the second pivot axis to the first pivot axis as the hinge moves from the intermediate open position to the closed position.

15. The hinge of claim 14, further including:
   an anti-rotation device configured allow rotation of the second leaf together with the connector in a single direction from the closed position to the intermediate position,
   a high torque creator operatively associated with the first shaft, the high torque creator configured to create a high resistive torque, the high resistive torque providing a hold-open feature for the associated closure allowing the associated closure to be held open at any position between the closed position and the intermediate open position, and
   a low torque creator operatively associated with the second shaft, the low torque creator configured to create a low resistive torque, the low resistive torque providing another hold-open feature for the associated closure allowing the associated closure to be held open at any position between the intermediate open position and a predetermined position located between the intermediate open position and the fully open position.

16. The hinge of claim 15, wherein the first shaft is fixed as the second leaf together with the connector rotate from the closed position to the intermediate open position via the anti-rotation device, and the second leaf together with the connector rotate from the intermediate open position to the closed position via rotation of the first shaft, rotation of the first shaft creating the high resistive torque via the high torque creator.

17. The hinge of claim 15, wherein the second leaf rotates together with rotation of the second shaft between the intermediate open position and the fully open position, rotation of the second shaft creating the low resistive torque via the low torque creator.

18. The hinge of claim 15, further including a supplemental torque creator operatively associated with the first shaft, the supplemental torque creator configured to create a constant supplemental resistive torque via rotation of the first shaft which is always opposite the direction of rotation of the closure between the closed position and the intermediate open position, the supplemental resistive torque dampening vibrations of the closure as the closure is moved between these positions.

19. A vehicle comprising:
   a load carrying floor having a cargo area provided beneath the floor;
   a closure selectively providing access to the cargo area, the closure having a first surface and a second surface; and
   a multi-torque double pivot hinge for movably connecting the closure to the floor, the hinge adapted move the closure between a closed position, an intermediate open position and a fully open position, the hinge including:
      a first hinge shaft defining a first pivot axis, the closure moveable between the closed position and intermediate open position about the first pivot axis,
      a second hinge shaft defining a second pivot axis, the closure moveable between the intermediate open position and the fully open position about the second pivot axis,
      an anti-rotation device and a high torque creator operatively associated with the first shaft, the high torque creator configured to create a high resistive torque, the high resistive torque providing a hold-open feature for the closure allowing the closure to be held open at any position between the closed position and the intermediate open position, and a low torque creator operatively associated with the second shaft, the low torque creator configured to create a low resistive torque, the low resistive torque providing another hold-open feature for the closure allowing the closure to be held open at any position between the intermediate open position and a predetermined position located between the intermediate open position and the fully open position, wherein in the closed position, the first and second shafts of the hinge are located beneath the floor allowing the first surface of the closure to be substantially coplanar with the floor, wherein in the intermediate position, the second shaft of the hinge is located above the floor, the location of the second hinge shaft in the intermediate open position allowing the second surface of the closure to be substantially coplanar with the floor in the fully open position.

20. The vehicle of claim 19, further including a supplemental torque creator operatively associated with the first shaft, the supplemental torque creator configured to create a constant supplemental resistive torque via rotation of the first shaft which is always opposite the direction of rotation of the closure between the closed position and the intermediate open position, the supplemental resistive torque dampening vibrations of the closure as the closure is moved between these positions.

\* \* \* \* \*